(12) United States Patent
Loh

(10) Patent No.: US 11,920,429 B2
(45) Date of Patent: Mar. 5, 2024

(54) INJECTION VALVE, METHOD AND SYSTEM

(71) Applicant: Yuh Loh, Cypress, TX (US)

(72) Inventor: Yuh Loh, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 202 days.

(21) Appl. No.: 17/513,142

(22) Filed: Oct. 28, 2021

(65) Prior Publication Data

US 2023/0139113 A1   May 4, 2023

(51) Int. Cl.
*E21B 34/10* (2006.01)
*F16K 15/02* (2006.01)
*F16K 27/02* (2006.01)

(52) U.S. Cl.
CPC ............ *E21B 34/10* (2013.01); *F16K 15/026* (2013.01); *F16K 27/0209* (2013.01)

(58) Field of Classification Search
CPC ..... E21B 34/10; F16K 15/026; F16K 27/0209
See application file for complete search history.

(56) References Cited

U.S. PATENT DOCUMENTS

| | | | |
|---|---|---|---|
| 6,666,273 B2 | 12/2003 | Laurel | |
| 9,540,905 B2 | 1/2017 | Woodford | |
| 2017/0096884 A1* | 4/2017 | Michel | F04B 53/14 |

FOREIGN PATENT DOCUMENTS

| | | |
|---|---|---|
| CN | 210289735 U | 4/2020 |
| CN | 112031718 A | 12/2020 |
| EP | 2769471 A1 | 8/2014 |

OTHER PUBLICATIONS

Notification of Transmittal of the International Search Report and Written Opinion; PCT/US2022/078506; Korean Intellectual Property Office; dated Feb. 20, 2023; 9 pages.

* cited by examiner

*Primary Examiner* — Nicole Coy
*Assistant Examiner* — Nicholas D Wlodarski
(74) *Attorney, Agent, or Firm* — CANTOR COLBURN LLP

(57) ABSTRACT

An injection valve including a housing, a fluid channel in the housing, and a check valve disposed in the housing and responsive to fluid pressure in the channel to move the check valve in a direction opposite the direction of fluid flow through the channel. A method for injecting fluid into a volume including pressurizing a fluid to be injected, conveying the pressurized fluid to a space about a check valve between a check valve nose and a stem seal; and moving the check valve in a direction opposite a direction of injection fluid flow. A borehole system including a borehole in a subsurface formation, a string disposed within the borehole, and an injection valve disposed within or as a part of the string.

13 Claims, 4 Drawing Sheets

INJECTION VALVE, METHOD AND SYSTEM

BACKGROUND

In the resource recovery and fluid sequestration industries, injection of fluids is a common necessity. Injection may be for stimulation of a reservoir to produce hydrocarbon fluids or may be to store fluids in a reservoir, such as $CO_2$. In either case, injection fluids are injected under pressure and therefore require a valve that prevents or inhibits flow of the injection fluid in an opposite direction to the injection direction. Injection valve are known but suffer from the degradative effects of injection fluids on functional components of the valves. This and other drawbacks reduce a useful life of injection valves. Longer lived valves would be well received by the arts that employ injection valves.

SUMMARY

An embodiment of an injection valve including a housing, a fluid channel in the housing, and a check valve disposed in the housing and responsive to fluid pressure in the channel to move the check valve in a direction opposite the direction of fluid flow through the channel.

A method for injecting fluid into a volume including pressurizing a fluid to be injected, conveying the pressurized fluid to a space about a check valve between a check valve nose and a stem seal; and moving the check valve in a direction opposite a direction of injection fluid flow.

A borehole system including a borehole in a subsurface formation, a string disposed within the borehole, and an injection valve disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
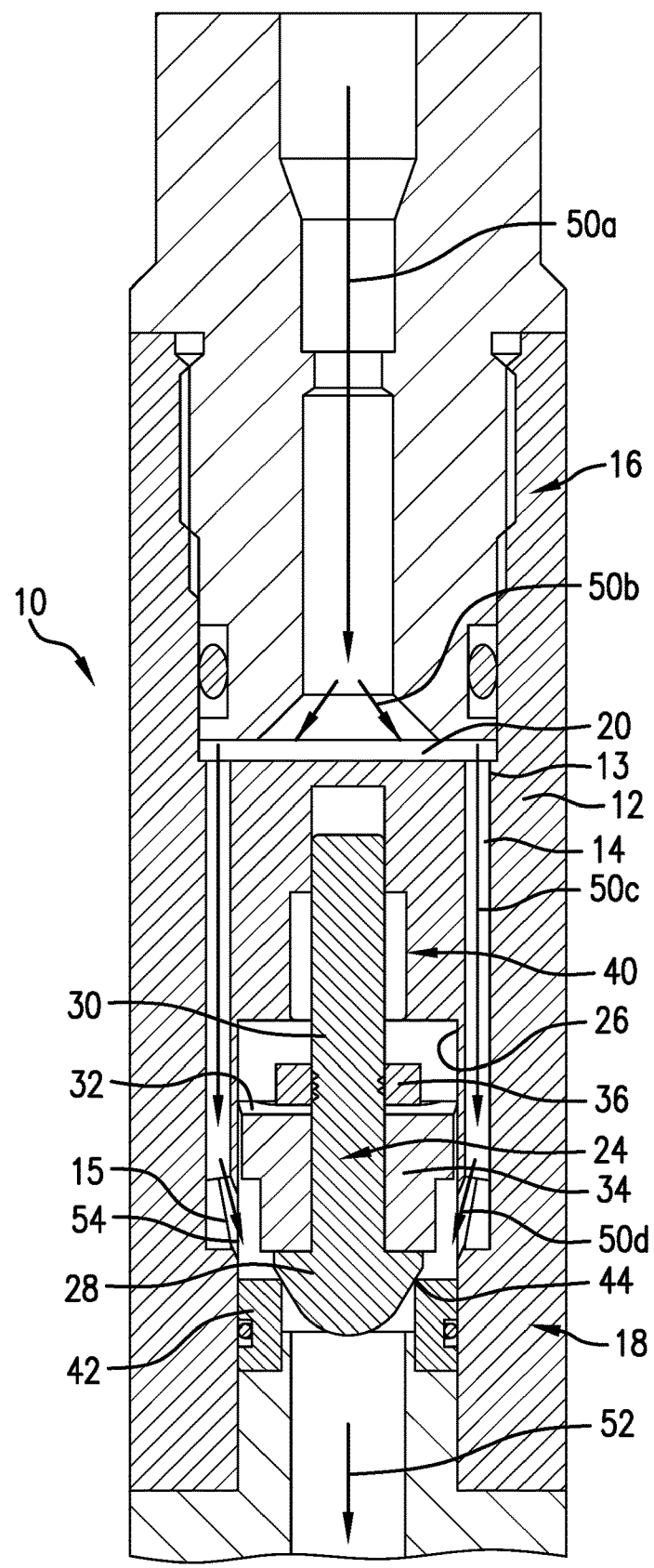
FIG. 1 is a schematic sectional view of an injection valve as disclosed herein.

Referring to FIG. 1, an injection valve 10 is illustrated. The valve 10 comprises a housing 12 having a fluid channel 14 defined therein. The fluid channel 14 is fluidly connected to a box end 16 of the housing and fluidly connected to a valve end 18 of the housing. Housing 12 is configured to receive injection fluid at manifold 20 fed from uphole as illustrated. The manifold 20 supplies fluid to the fluid channel 14, having an inlet end 13 and an outlet end 15. In embodiments, there may be one or more channels 14 with two shown. The greater the number of channels (assuming real estate is available) the greater the volume of injection fluid that can pass through the injection valve 10 per unit time.

Figure 2:
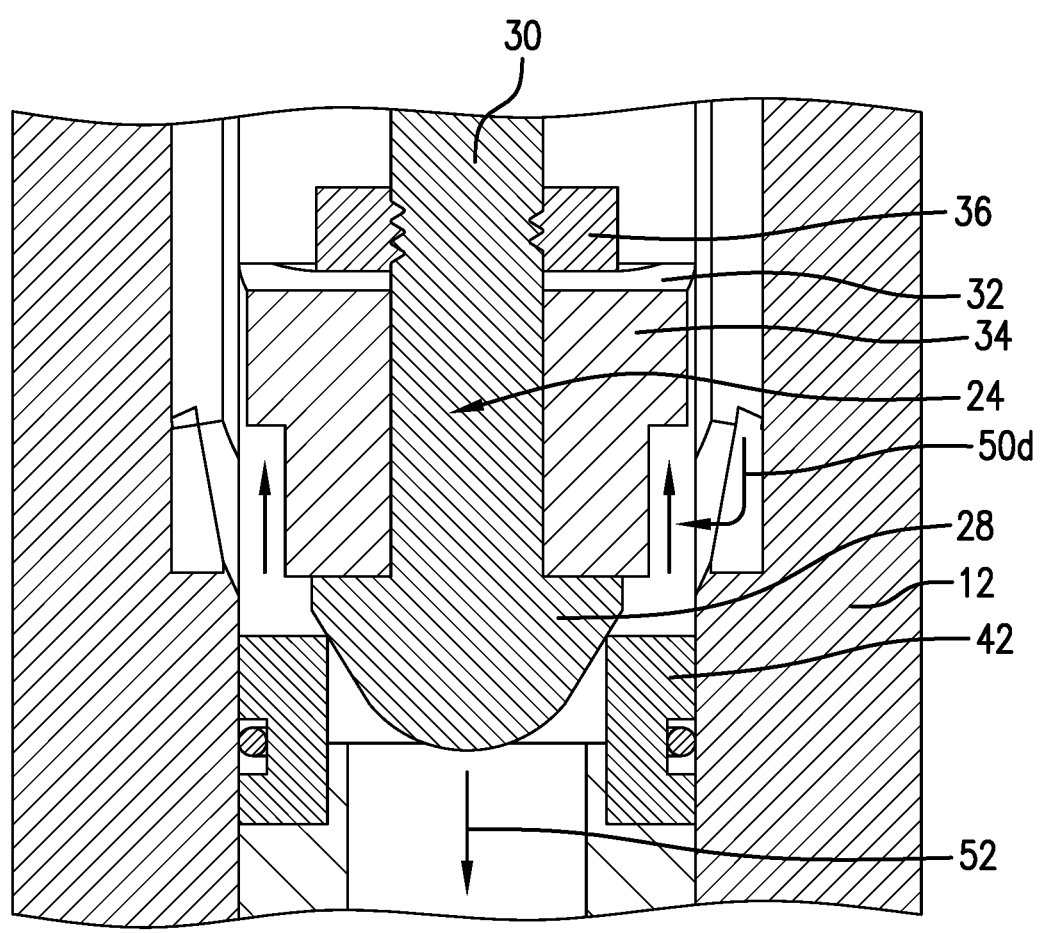
FIG. 2 is an enlarged view of a portion of FIG. 1.
Figure 3:
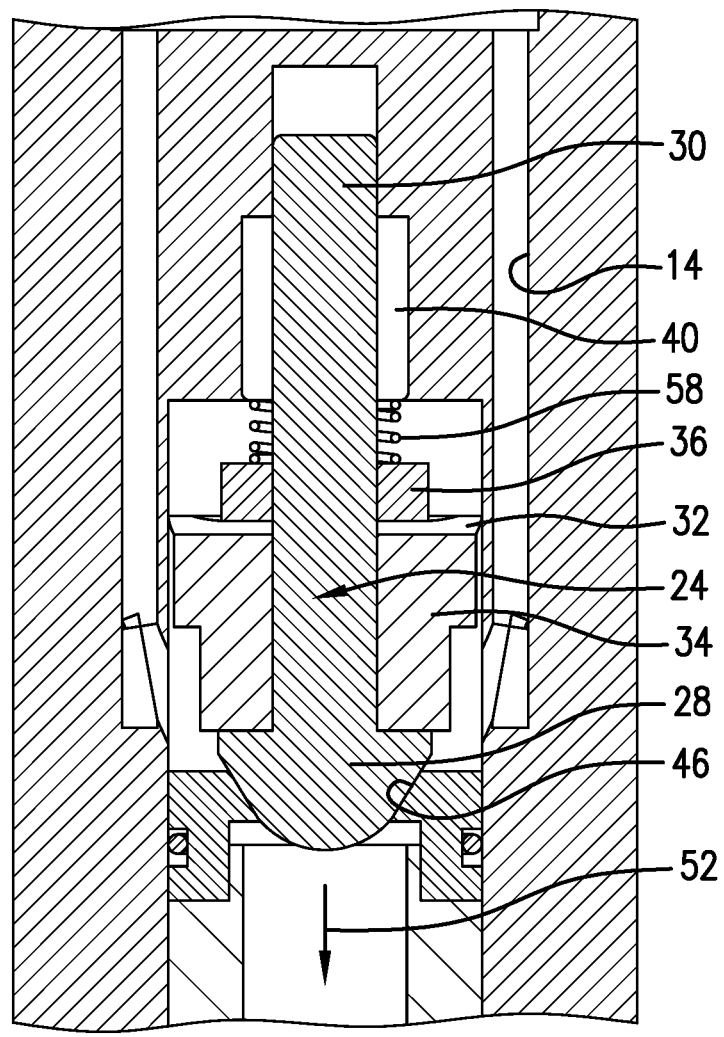
FIG. 3 is a view illustrating two alternate sub configurations of the injection valve of FIG. 1.

At end 18 of the housing 12, there is disposed in the housing 12 a check valve 24. Check valve 24 is disposed in recess 26 of housing 12. The check valve 24 comprises a valve nose 28 and a stem 30 extending from the nose 28. A seal 32 extends radially of the stem 30 into sealing contact with the recess 26. In an embodiment, a weight 34 is disposed on the stem 30 adjacent the nose 28, the seal 32 is adjacent the weight 34 and a retainer 36, such as a nut, is disposed on the stem 30 to retain the seal 32 and the weight 34. In some embodiments, the housing 12 will support a stem alignment configuration 40, which may be a roller screw, a ball nut, a bushing, a bearing, etc., that provides low friction but helps to stabilize the motion of the check valve 24 during cycling. The stem alignment configuration 40 may also or instead be employed to slow down the opening and/or closing speed of the check valve 24. This can help reduce flow cutting of the nose or seat upon opening and/or reduce impact of the nose 28 against a seat 42 when closing. The housing 12 supports the seat 42 in a fixed position for the nose 28 to seal against when the check valve is closed. Were the valve 24 to close rapidly, the nose 28 would have to come to an abrupt stop when contacting the seat and possibly have its useful lifetime reduced. With longevity being a premium in all downhole activities, employing the configuration 40 to slow the movement of the nose 28 may be desirable. The seat 42 may be a line seat (see contact line 44) such as illustrated in FIGS. 1 and 2 or may be a chamfer seat (see chamfer 46) as shown in FIG. 3, as desired.

Reference is made to the arrows 50a, b, c, and d. that extend through the injection valve 10. These illustrate the path of injection fluid flowing through the valve 10. Since the valve is closed in each of the views, there are no arrows for the injected fluid flow past the open nose 28 but those of skill in the art will understand that once the nose 28 is off seat 42, flow will move through the gap created at that opening and then can travel in the direction of arrow 52 noted in each of FIGS. 1-3.

In operation, the injection valve 10 is unusual in that the check valve 24 opens by being driven in an opposite direction to that of the injection fluid. In FIG. 1, for example, the injection fluid is moving downwardly of the Figure but in order to move the nose 28 off seat 42, the check valve 24 must move upwardly of the figure. The injection fluid at 50d flows into a space 54 that is bounded by nose 28, seat 42, housing 12 and seal 32. Adding pressure to this space 54 with the injection fluid causes the nose 28 to pull back away from the seat 42, moving in an opposite direction to the direction of fluid injection and open an injection fluid pathway that results in fluid flow along arrow 52. Importantly, it is noted that only the portions of check valve 24 that bound the space 54 are subject to contact with the injection fluid while other portions of the check valve on the opposite side of seal 32 are spared any deleterious activity the injection fluid poses.

One common intended use for the disclosed injection valve 10 is in vertical boreholes. In a vertical position, the check valve 24 is opened as stated and closed based upon the weight 34 acting in concert with gravity. For situations where the injection valve 10 is intended to be used in a highly deviated or horizontal well, it may be beneficial to add a biaser 58 (illustrated in FIG. 3) to act against the impetus to open the check valve 24 by biasing the check valve 24 to the closed position. The biaser 58 may be a coil spring as illustrated or may be any other spring member such as an elastic material, a compressed gas, etc. A biaser 58 will automatically urge the valve 24 to a closed position upon it being opened by the injection fluid pressurizing space 54.

The check valve 24 will remain in the open position so long as the pressure in space 54 exceeds a spring force of the biaser 58.

Figure 4:
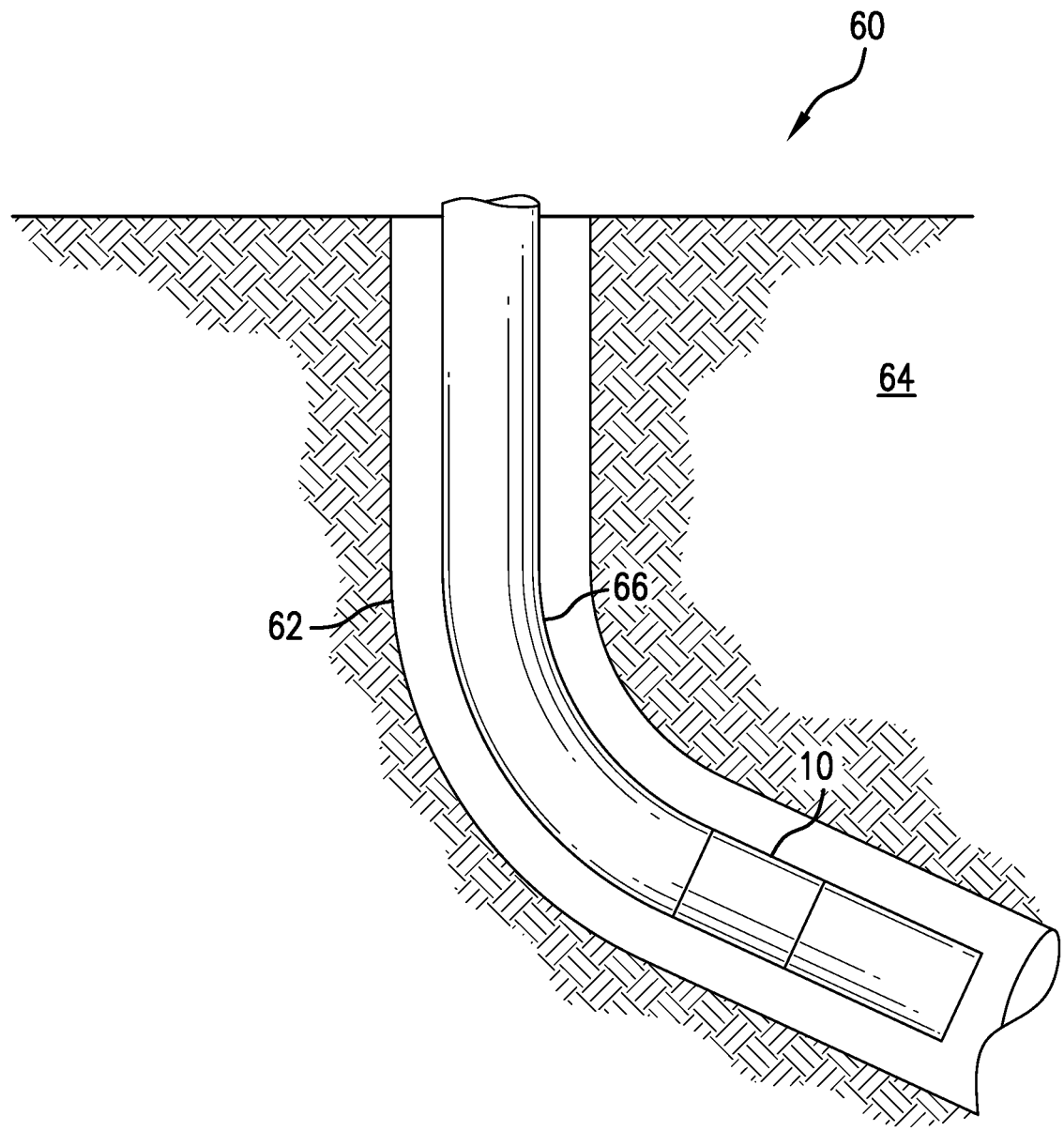
FIG. 4 is a view of a borehole system including the injection valve disclosed herein.

Referring to FIG. 4, a borehole system 60 is illustrated. System 60 comprises a borehole 62 in a subsurface formation 64. A string 66 is disposed in the borehole 62. An injection valve 10 as disclosed herein is disposed within or as a part of the string 66.

Set forth below are some embodiments of the foregoing disclosure:

Embodiment 1: An injection valve including a housing, a fluid channel in the housing, and a check valve disposed in the housing and responsive to fluid pressure in the channel to move the check valve in a direction opposite the direction of fluid flow through the channel.

Embodiment 2: The valve as in any prior embodiment wherein the check valve includes a valve nose, a valve stem extending from the valve nose, a stem seal extending radially outwardly of the valve stem to the housing and creating a seal therewith, the seal being spaced from the valve nose.

Embodiment 3: The valve as in any prior embodiment further including a weight disposed on the check valve.

Embodiment 4: The valve as in any prior embodiment wherein the channel includes an inlet end and an outlet end, the outlet end being disposed between the valve nose and the stem seal.

Embodiment 5: The valve as in any prior embodiment wherein the housing further supports a stem alignment configuration.

Embodiment 6: The valve as in any prior embodiment wherein the stem alignment configuration is a bearing or bushing.

Embodiment 7: The valve as in any prior embodiment wherein the stem alignment configuration is a roller screw.

Embodiment 8: The valve as in any prior embodiment wherein the stem alignment configuration is a ball nut.

Embodiment 9: The valve as in any prior embodiment further including a seat against which the check valve seals.

Embodiment 10: The valve as in any prior embodiment wherein the seat is a line seat.

Embodiment 11: The valve as in any prior embodiment wherein the seat is a chamfer seat.

Embodiment 12: The valve as in any prior embodiment further including a biaser configured to bias the check valve to a closed position.

Embodiment 13: A method for injecting fluid into a volume including pressurizing a fluid to be injected, conveying the pressurized fluid to a space about a check valve between a check valve nose and a stem seal; and moving the check valve in a direction opposite a direction of injection fluid flow.

Embodiment 14: The method as in any prior embodiment further comprising biasing the check valve to a closed position with a weight.

Embodiment 15: The method as in any prior embodiment further comprising biasing the check valve to a closed position with a biaser.

Embodiment 16: The method as in any prior embodiment wherein the biasing is automatic via spring.

Embodiment 17: A borehole system including a borehole in a subsurface formation, a string disposed within the borehole, and an injection valve as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An injection valve comprising:
   a housing;
   a fluid channel in the housing, the channel having an inlet and an outlet;
   a check valve disposed in a recess of the housing;
   a seal disposed about the check valve and in sealing contact with the housing; and
   wherein the check valve is exposed to fluid pressure from the outlet only on one side of the seal, the check valve responsive to the fluid pressure to move in a direction opposite the direction of fluid flow through the channel.

2. The valve as claimed in claim 1 wherein the check valve includes:
   a valve nose;
   a valve stem extending from the valve nose;
   a stem seal extending radially outwardly of the valve stem to the housing and creating a seal therewith, the seal being spaced from the valve nose.

3. The valve as claimed in claim 2 further including a weight disposed on the check valve.

4. The valve as claimed in claim 2 wherein the channel includes an inlet end and an outlet end, the outlet end being disposed between the valve nose and the stem seal.

5. The valve as claimed in claim 2 wherein the housing further supports a stem alignment configuration.

6. The valve as claimed in claim 5 wherein the stem alignment configuration is a bearing or bushing.

7. The valve as claimed in claim 5 wherein the stem alignment configuration is a roller screw.

8. The valve as claimed in claim 5 wherein the stem alignment configuration is a ball nut.

9. The valve as claimed in claim 1 further including a seat against which the check valve seals.

10. The valve as claimed in claim 9 wherein the seat is a line seat.

11. The valve as claimed in claim 9 wherein the seat is a chamfer seat.

12. The valve as claimed in claim 1 further including a biaser configured to bias the check valve to a closed position.

13. A borehole system comprising:
a borehole in a subsurface formation;
a string disposed within the borehole; and
an injection valve as claimed in claim 1 disposed within or as a part of the string.

* * * * *